J. W. Menhall & C. G. Clement.
TRACTOR TRAILER COUPLING.
APPLICATION FILED APR. 26, 1917.
1,240,995.
Patented Sept. 25, 1917.
2 SHEETS—SHEET 2.
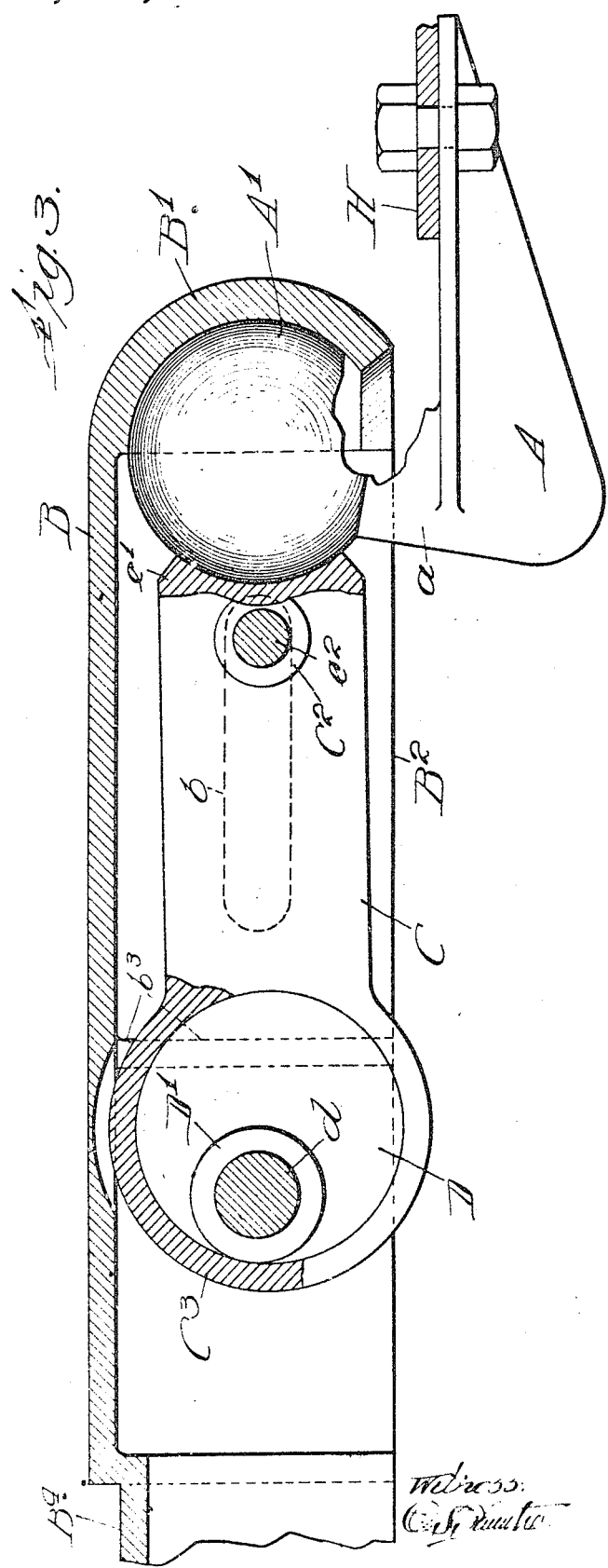
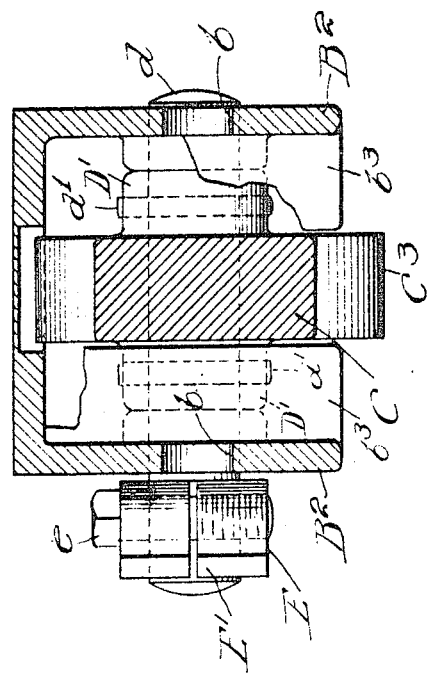

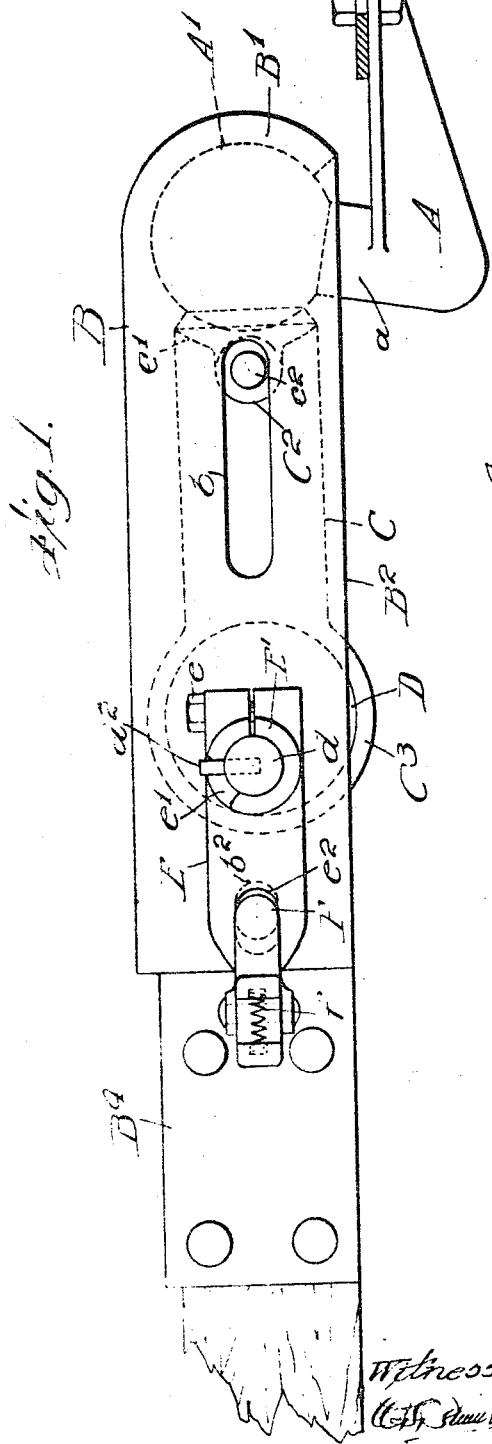

UNITED STATES PATENT OFFICE.

JAMES W. MENHALL AND CHARLES G. CLEMENT, OF BELOIT, WISCONSIN.

TRACTOR-TRAILER COUPLING.

1,240,995.  Specification of Letters Patent.  Patented Sept. 25, 1917.

Application filed April 26, 1917.  Serial No. 164,772.

*To all whom it may concern:*

Be it known that we, JAMES W. MENHALL and CHARLES G. CLEMENT, residing at Beloit, in the county of Rock and State of Wisconsin, have invented new and useful Improvements in Tractor-Trailer Couplings, of which the following is a specification, reference being had to the accompanying drawings, forming a part thereof.

The purpose of this invention is to provide new and improved construction in a coupling for connecting a tractor to a trailer. It consists in the elements and features of construction shown and described, as indicated in the claims.

In the drawings:—

Figure 1 is a side elevation of a device embodying this invention, the same being shown with its two principal members connected respectively to the tractor axle and to the trailer pole or draw bar.

Fig. 2 is a partly sectional plan view of the same shown without the connection to the tractor trailer, section being axial with respect to the transverse pivots.

Fig. 3 is a longitudinal vertical section at the line, 3—3, on Fig. 2.

Fig. 4 is a section at the line, 4—4, on Fig. 2.

The coupling shown in the drawings comprises two principal members which are connected together at a ball and socket joint, the member, A, is designed to be connected rigidly in any convenient manner to the tractor, as by the U-shaped bar, H, bolted to the tractor axle, as indicated at J, said member, A, having a terminal consisting of a ball, $A^1$, carried at the upper end of the stem, $a$, said member, A, being hereinafter referred to as the ball member. The socket member, B, is provided at its rear end with a channel-shaped terminal, $B^4$, for bolting it securely to a forwardly-projecting tongue or pole piece of the vehicle to be drawn, and at its forward end it has the socket, $B^1$, which is open rearwardly and also open downwardly at the rear part for the admission of the ball, $A^1$, to said socket from the rear, the ball being first inserted upwardly at the rear of the socket in order to be moved forwardly into the latter. The main portion of the socket member, B, rearwardly of the rearwardly-open socket, $B^1$, is formed with lateral flanges, $B^2$, $B^2$, constituting said member a downwardly-opening housing for the follower, C, which has at its forward end a concavely-segmental head, $C^1$, adapted to form a closure, or partial closure, for the rear side of the ball socket, and to seat against the rear side of the ball, $A^1$, for retaining the same in the socket. The follower, C, is adapted to be reciprocated longitudinally in the socket member,—that is, to move toward and from the socket and the ball therein,—for closing and opening the socket to retain the ball or permit its removal and reëntrance; and for that purpose said follower is engaged with the socket member by means of a cross-pin, $c^2$, which extends through a cross-head, $C^2$, at the forward part of the follower, immediately in the rear of its concavely-segmental head, $C^1$, said cross-head, $C^2$, being adapted to position the follower definitely between the side flanges, $B^2$, said side flanges having longitudinal slots, $b$, in which the ends of the cross-pin, $c^2$, engage and are adapted to pivot and slide. At the rear end the follower, C, terminates in the eccentric band or strap, $C^3$, which is engaged by an eccentric, D, carried by a rock shaft, $d$, which is mounted for rocking in the socket member, being journaled in the side flanges, $B^2$, thereof. The eccentric, D, has a hub formed by the laterally-extending projections, $D^1$, $D^1$, through the center of which hub the rock shaft extends, and to which it is pinned fast by the pins, $d^1$. The rock shaft extends at one end outside of the follower housing or socket member, and on its exteriorly-projecting end there is secured an operating lever or crank arm, E, for rocking the rock shaft and thereby operating the eccentric to give the longitudinal thrust to the follower, C, toward and from the ball socket, $B^1$, for closing and opening said socket to retain or release the ball, $A^1$. The throw of the eccentric, D, is designed to be sufficient to withdraw the head, $C^1$, from closed position far enough to easily permit the ball, $A^1$, to be withdrawn from the socket rearwardly, and then downwardly from the housing for complete disengagement of the two parts, A and B. This throw of the eccentric is obtained by rocking the rock shaft to carry the eccentric downwardly from its forward position and rearwardly into its most extreme rearward position, this action being permitted by the structure of the follower housing or socket member, $B^1$, being downwardly open, as above described. At operative position,—that is to say, when the ball is engaged with the socket and retained therein by the follower,—it is important that the rear thrust of the tractor in backing the load, which rear thrust is transmitted primarily and immediately to the follower, C, should ultimately be transmitted as directly as possible to the tongue to which the member, B, is bolted as described, that is to say, with the least liability, or if possible with no liability at all, to rock the eccentric by such rear thrust; and for this purpose the eccentric, D, is proportioned and positioned with respect to the rock shaft, $d$, so that the center of the eccentric at the forward position at which it holds the head, $C^1$, against the ball, $A^1$, is substantially or approximately in the line of thrust from the ball, $B^1$, toward the rock shaft, $d$. Certain range of adjustment is desirable for purposes hereinafter explained, and the position of said eccentric center is therefore not necessarily absolutely in the exact line from the center of the ball to the rock shaft; the range of adjustment is desirably limited so that the position of said eccentric center throughout that range is still within the line of thrust generally considered from the ball to the rock shaft, the practical limits of said range being such as to keep said eccentric center throughout the adjustment mentioned within an angle about the ball center which is subtended by the diameter of the rock shaft.

The lever or crank arm, E, is secured to the end of the rock shaft, $d$, projecting outside the casing or socket member, B, by rifting the hub, $E^1$, of said lever arm and providing it with a clamping bolt, $e$. For locking the rock shaft and eccentric in position for holding the follower, $C^1$, in socket-closing position, the lever or crank arm being provided with a catch, F, pivoted to said crank arm and having its nose, $F^1$, thrusting through an aperture, $e^2$, in the crank arm, and an aperture, $b^2$, in the casing which is registered with the aperture, $e^2$, when the crank arm is in the position for holding the eccentric in the proper position to thrust and hold the follower, $C^1$, in socket-closing position. A spring, $f$, reacting between the catch and the lever crank arm, E, operates for holding the catch-nose, $F^1$, in engaged position. In order that there may be a limited range of adjustment of the follower, $C^1$, at its socket-closing position to prevent it from too tightly binding the ball, $A^1$, and at the same time prevent such looseness as would cause a rattle at the joint (such adjustment being necessary in order to provide for unavoidable variations in construction and for wear of the ball and socket members,) and to provide for this adjustment without the liability of getting the crank arm secured to the rock shaft at a position which would prevent throwing the eccentric far enough to effect proper closure of the socket, there is provided a pin, $d^2$, in the end portion of the rock shaft, which pin plays in a segmental notch, $e^1$, at one side of the hub, $E^1$, of the lever or crank arm, E, the extent of said notch being such as to permit only a range of adjustment within which the eccentric center will be within an angle about the ball center, which will be subtended by the diameter of the rock shaft, as above indicated.

We claim:—

1. A tractor trailer coupling comprising a socket member having a socket open rearwardly and also open downwardly; a ball member having a stem on which it is carried projecting upwardly for engagement with the socket member; a concavely segmental follower mounted for sliding back and forward in the socket member for closing and unclosing the socket at the rear side; an eccentric mounted for rocking in the socket member operatively engaged with the follower for reciprocating the latter; an exteriorly-accessible crank arm on the eccentric shaft for rocking said eccentric, said crank arm being angularly adjustable on the eccentric shaft for limiting the thrust of the follower toward the ball.

2. A tractor trailer coupling comprising a socket member having a rearwardly-open socket; a ball member having the ball adapted to enter said socket from the rear; a follower mounted for movement back and forward in the socket member for closing and unclosing the socket at the rear and holding the ball seated in the socket; an eccentric mounted for rocking in the rear portion of the socket member and operatively connected with the rear portion of the follower, and exteriorly-accessible means for rocking the eccentric to operate the follower, the socket member being formed with lateral flanges forming a housing for the follower, and having longitudinal slots in said flanges, the follower having near the head a cross pin pivotally and slidably engaging said slots the trend of the slots being toward the axis of the eccentric rock shaft, whereby at the foremost position of the follower the eccentric center is substantially in the line of rear thrust on the follower, and such rear thrust is transmitted through the eccentric rock shaft to the socket.

3. A tractor trailer coupling comprising a socket member adapted to be rigidly secured to the vehicle to be drawn; a ball member adapted to be secured to the tractor; the socket member having a socket which is rearwardly open, and the ball member being adapted to be entered into the socket from the rear; a follower mounted in the socket member for closing the socket at the rear and holding the ball forwardly in the socket, said ball being pivotally and slidably engaged at its forward part with the socket member; an eccentric mounted for rocking in the rear portion of the socket member, and operatively connected with the rear end of the follower, for reciprocating the latter by the rocking of the eccentric, said eccentric being proportioned and positioned with respect to the rock shaft to substantially aline the eccentric center between the rock shaft axis and the ball socket center at the foremost position of the follower, and means for securing the rock shaft in position to hold the eccentric with its center so alined.

4. A tractor trailer coupling comprising a socket member adapted to be rigidly secured to the vehicle to be drawn; a ball member adapted to be secured to the tractor; the socket member having a socket which is rearwardly open, and the ball member being adapted to be entered into the socket from the rear; a follower mounted in the socket member for closing the socket at the rear and holding the ball forwardly in the socket, said follower being pivotally and slidably engaged at its forward part with the socket member; an eccentric mounted for rocking in the rear portion of the socket member, and operatively connected with the rear end of the follower for reciprocating the latter by the rocking of the eccentric, said eccentric being proportioned and positioned with respect to the rock shaft to substantially aline the eccentric center between the rock shaft axis and the ball socket center at the foremost position of the follower; means for securing the rock shaft in position to hold the eccentric with its center so alined; a lever arm angularly adjustable on the rock shaft for rocking the eccentric, and means for engaging the lever arm with the socket member for locking the eccentric in ball-securing position of the follower, the range of adjustment of the lever arm on the rock shaft being such as to shift the eccentric center transversely of the line from the ball center to the rock shaft axis through an angle about said ball center less than that subtended by the diameter of the rock shaft.

In testimony whereof, we have hereunto set our hands at Beloit, Wisconsin, this 23 day of April, 1917.

JAMES W. MENHALL.
CHARLES G. CLEMENT.